(12) United States Patent
Tabata

(10) Patent No.: US 7,899,238 B2
(45) Date of Patent: Mar. 1, 2011

(54) IMAGE PROCESSING DEVICE, INSPECTION DEVICE, IMAGE PROCESSING METHOD, INSPECTION METHOD, COMPUTER READABLE MEDIUM, AND COMPUTER DATA SIGNAL

(75) Inventor: Shinji Tabata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1002 days.

(21) Appl. No.: 11/730,445

(22) Filed: Apr. 2, 2007

(65) Prior Publication Data

US 2008/0055671 A1 Mar. 6, 2008

(30) Foreign Application Priority Data

Sep. 4, 2006 (JP) ............................. 2006-238929

(51) Int. Cl.
*G06K 9/00* (2006.01)
(52) U.S. Cl. ........................................ 382/141; 382/100
(58) Field of Classification Search ................ 382/100, 382/141, 218
See application file for complete search history.

(56) References Cited

U.S. PATENT DOCUMENTS

| 7,242,767 | B2* | 7/2007 | Sako et al. ..................... 380/22 |
| 7,301,324 | B2 | 11/2007 | Yamaguchi et al. ...... 324/76.11 |
| 2005/0018258 | A1* | 1/2005 | Miyagi et al. ............... 358/521 |
| 2006/0007471 | A1* | 1/2006 | Okamoto et al. ........... 358/1.14 |

FOREIGN PATENT DOCUMENTS

| JP | 9-120456 | 5/1997 |
| JP | 2004-285524 | 10/2004 |
| JP | 2007-179088 A | 7/2007 |

* cited by examiner

*Primary Examiner*—Daniel G Mariam
(74) *Attorney, Agent, or Firm*—Morgan, Lewis & Bockius LLP

(57) ABSTRACT

An image processing device comprises: an obtaining unit that obtains a first image data set expressing a first face of a sheet-type material in which one or more objects to be tested is embedded, and a second image data set expressing a second face opposite to the first face; and a specifying unit that specifies a condition of the embedded one or more objects to be tested in the sheet-type material, depending on the first and second image data sets obtained by the obtaining unit.

15 Claims, 9 Drawing Sheets

FIG. 3
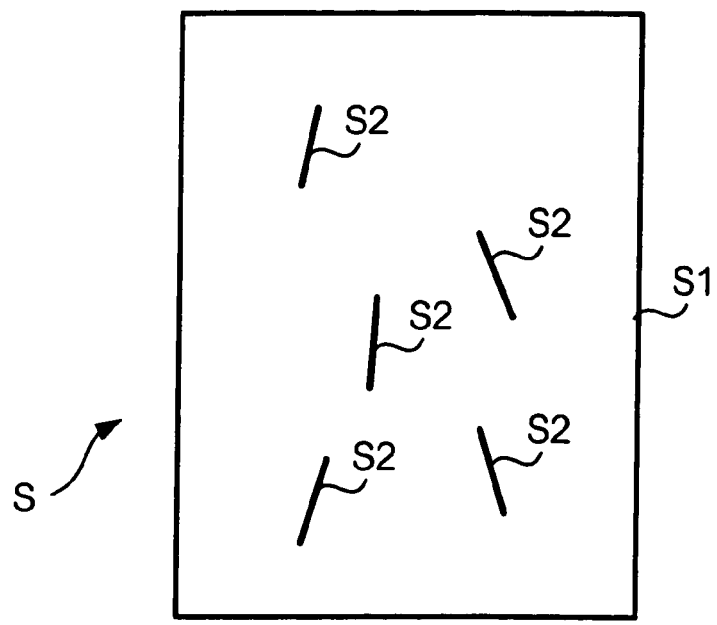
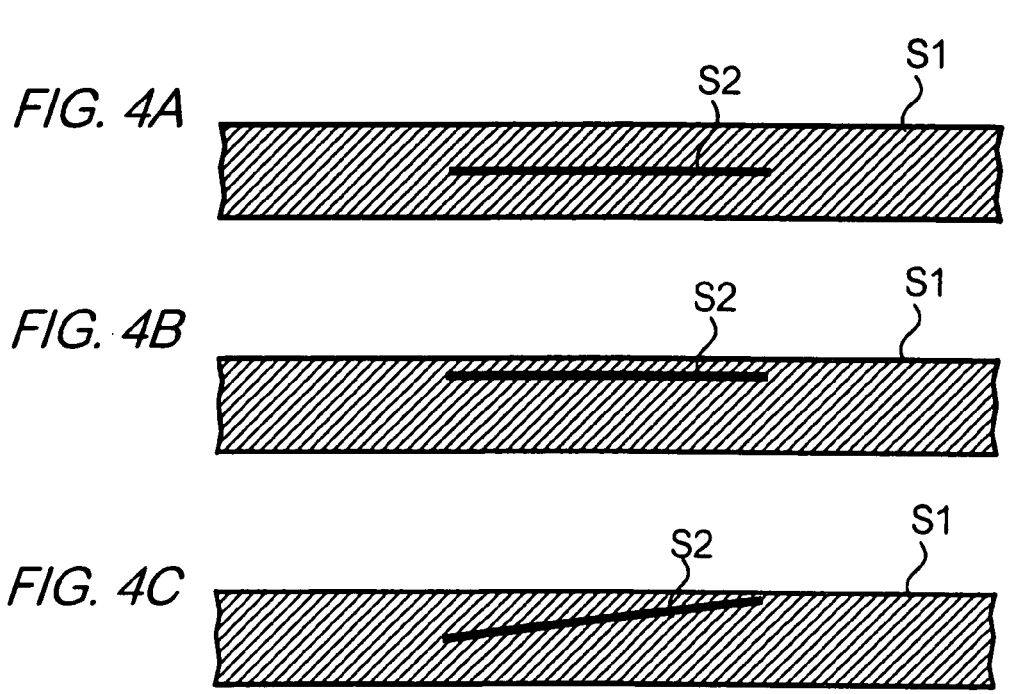
FIG. 4A
FIG. 4B
FIG. 4C

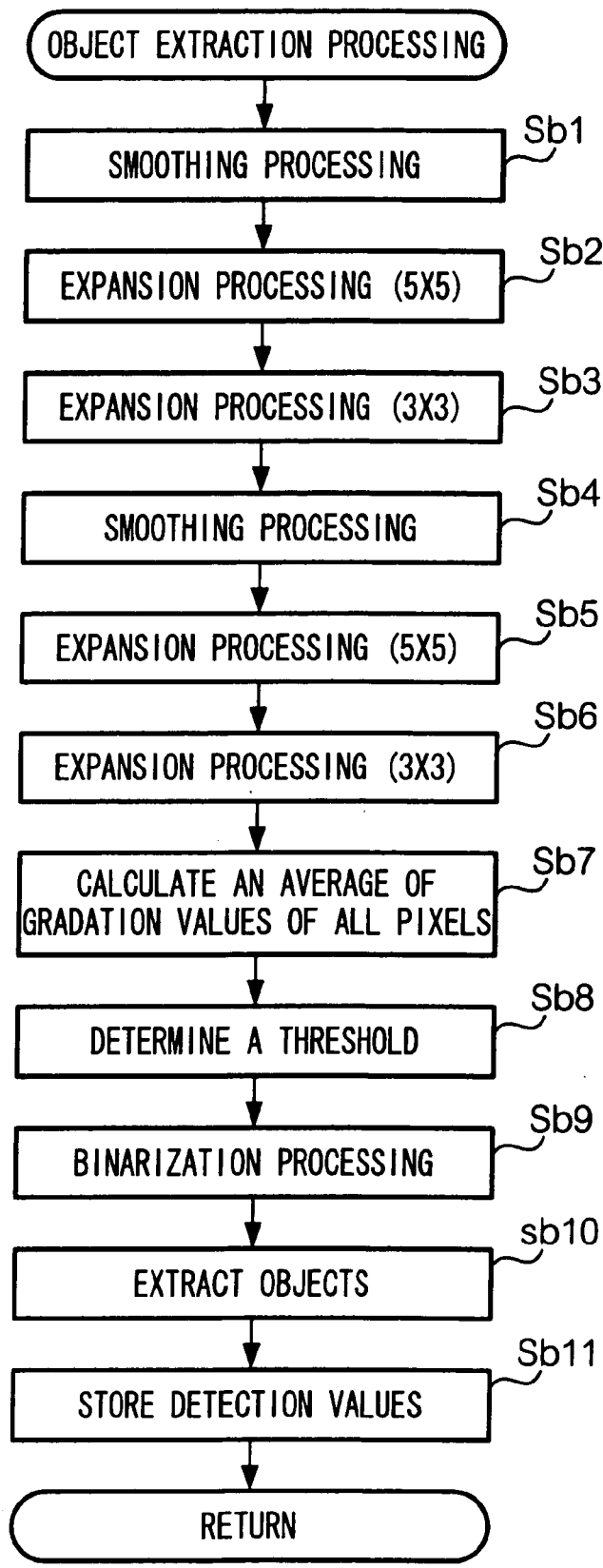

FIG. 9
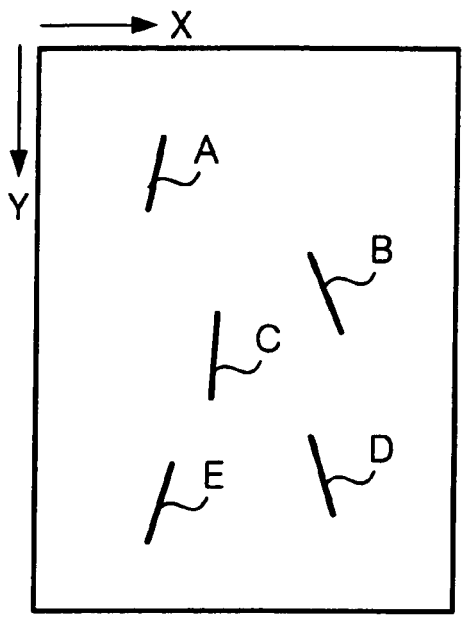
FIG. 10
| OBJECT | LENGTH | BOUNDARY LENGTH | AREA | CENTROID (X) | CENTROID (Y) | ANGLE |
|---|---|---|---|---|---|---|
| A | 591 | 1226 | 21793 | 1417 | 1654 | 11 |
| B | 567 | 1181 | 19327 | 3071 | 2835 | 147 |
| C | 599 | 1269 | 21049 | 2126 | 4016 | 4 |
| D | 613 | 1322 | 22250 | 3007 | 5197 | 155 |
| E | 621 | 1292 | 22530 | 1554 | 5669 | 17 |
FIG. 11
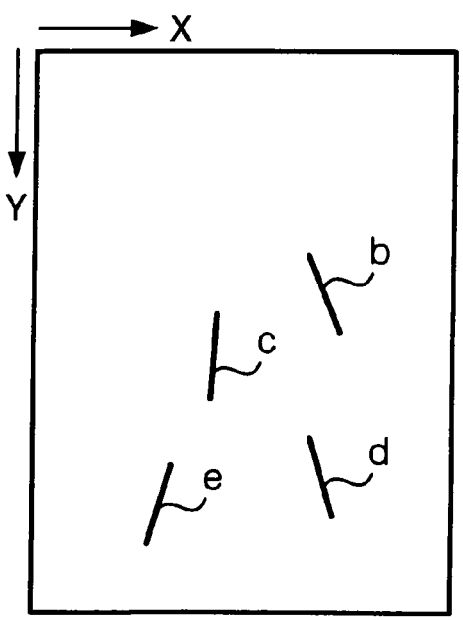

US 7,899,238 B2

IMAGE PROCESSING DEVICE, INSPECTION DEVICE, IMAGE PROCESSING METHOD, INSPECTION METHOD, COMPUTER READABLE MEDIUM, AND COMPUTER DATA SIGNAL

CROSS-REFERENCE TO RELATED APPLICATIONS

This application is based on and claims priority under 35 U.S.C. 119 from

Japanese Patent Application No. 2006-238929 filed on Sep. 4, 2006.

BACKGROUND

1. Technical Field

The present invention relates to an image processing device, inspection device, image processing method, inspection method, and computer readable medium for storing related program.

2. Related Art

There are known sheet-type materials (such as paper sheets, films, or cards) in which an object such as an IC tag, IC chip, metal fiber, or the like is embedded. Occasion arises when it becomes necessary to check whether such an object is appropriately embedded in the sheet material, without disturbing the structure of the material.

In this connection, there is known in the art a method for determining whether, for example, a particular fiber is appropriately embedded in a material, such as a paper sheet, which is done by capturing an image of the target sheet, and then performing different imaging processes on the captured image to extract, on the basis of the embedded fiber, characterizing information about the sheet.

In this way, it is possible to authenticate a target sheet on the basis of image information obtained an object embedded in the sheet.

SUMMARY

According to an aspect of the invention, there is provided an image processing device comprising: an obtaining unit that obtains a first image data set expressing a first face of a sheet-type material in which one or more objects to be tested is embedded, and a second image data set expressing a second face opposite to the first face; and a specifying unit that specifies a condition of the embedded one or more objects to be tested in the sheet-type material, depending on the first and second image data sets obtained by the obtaining unit.

BRIEF DESCRIPTION OF THE DRAWINGS

An exemplary embodiment of the present invention will be described in detail based on the following figures, wherein:

FIG. 3 shows an example of a sheet-type material;

FIG. 4 shows examples of a sheet-type material;

FIG. 7 is a flowchart showing object extraction processing executed by the inspection device;

FIG. 9 shows an example of a first image data set;

FIG. 10 is a table showing detection values specified from the image data set shown in FIG. 9;

FIG. 11 illustrates a second image data set corresponding the first image data set in FIG. 9;

DETAILED DESCRIPTION

Hereinafter, an exemplary embodiment of the invention will be described with reference to the drawings. In the following, an example suitable for practicing the invention will be described exemplifying a specific operation example in the exemplary embodiment.

Structure

Figure 1:
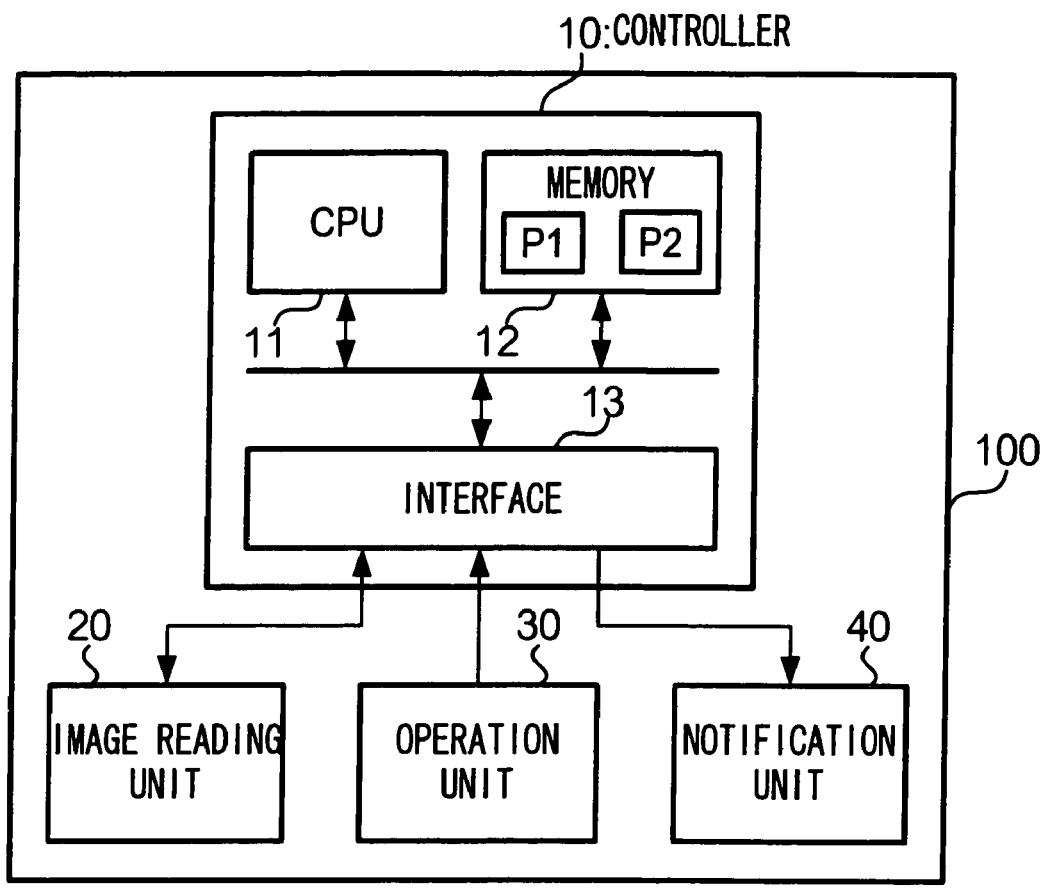
FIG. 1 is a block diagram showing an overall configuration of an inspection device according to an embodiment of the invention.

FIG. 1 is a block diagram showing the entire structure of an inspection device 100. As shown in the figure, an inspection device 100 has a controller 10, image reading unit 20, operation unit 30, and notification unit 40. The controller 10 controls operation of the image reading unit 20 and notification unit 40, and executes predetermined image processing on obtained image data. The image reading unit 20 optically reads a sheet (or a sheet-type material), generates image data expressing the sheet, and supplies the image data controller 10. The operation unit 30 has an input device such as a keyboard or buttons as operators. The operation unit 30 receives operation inputted by a user, generates a control signal expressing the operation, and supplies the signal to the controller 10. The notification unit 40 has a liquid crystal display or loudspeaker, and outputs image signals and audio signals supplied form the controller 10, thereby to inform the user of various information.

More specifically, the controller 10 has a CPU (Central Processing Unit) 11, memory 12, and interface 13. The CPU 11 executes programs stored in the memory 12. The memory 12 has a ROM (Read Only Memory) storing various programs, and a RAM (Random Access Memory) which functions as a work area for the CPU 11. The interface 13 is a physical interface which enables exchange of data with respective units connected to the controller 10. The interface 13 obtains various information from the image reading unit 20 and operation unit 30 and supplies various information to these units.

The memory 12 stores a basic program P1 for controlling operation of the inspection device 10, and an inspection program P2 for making a determination on a sheet. The inspection program P2 realizes processing for comparing image data, in addition to image processing such as smoothing processing, expansion processing, and binarization processing. Details of such processing will be described later.

Figure 2:
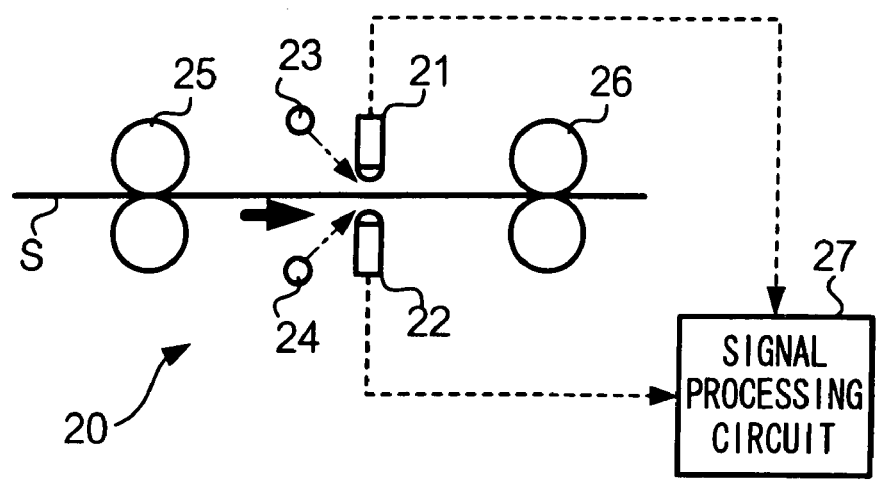
FIG. 2 is a diagram showing a structure of an image reading unit in the inspection device.

FIG. 2 specifically shows the structure of the image reading unit 20. As shown in this figure, the image reading unit 20 has sensors 21 and 22, light sources 23 and 24, conveyor rolls 25 and 26, and a signal processing circuit 27. The sensors 21 and 22 each are, for example, a contact CCD (Charge Coupled Device) image sensor. The sensors 21 and 22 pick up images of first and second faces of a sheet S and generates an image signal. In this case, for convenience of explanation, the face which the sensor 21 senses is regarded as the first face, as well as the other face which the sensor 22 senses the second face. The light sources 23 and 24 are, for example, fluorescent lamps and irradiate light on positions at which images are picked up by the sensors 21 and 22, respectively. The conveyor rolls 25 and 26 are roll-type members which convey the sheet S in a direction pointed by an arrow in the figure. The signal processing circuit 27 performs signal processing such as A-to-D conversion or the like on image signals supplied from the sensors 21 and 22, and outputs digital image data converted from analogue image signals. The sensors 21 and 22, light sources 23 and 24, and sheet S have definite widths in a direction vertical to the paper face of FIG. 2. This direction will be hereinafter referred to as an "X-direction". Further, directions perpendicular to the X-direction, i.e., the directions denoted by the arrow in FIG. 2 will be referred to as "Y-directions" as well.

Although an arbitrary size and gradation are available for the image data, image data of an A4 size (210 mm×297 mm) is read at input resolution of 600 dots (pixels) per inch, and each dot is data expressing 8-bit gradation (consisting of 256 gradation colors), in this case. At this time, "0" is a gradation value (gradation information) expressing white, and "255" is a gradation value (gradation information) expressing black. The image data includes the entire of the first and second faces of a sheet.

Now, the sheet to be read in this embodiment will be described with reference to FIGS. 3 and 4. As shown in FIG. 3, the sheet S in the embodiment is a sheet-type material formed by embedding objects S2 to be tested in a base material S1. A material similar to an ordinary paper sheet is used as a base material S1 and contains pulp fiber as its major constituent material. The objects S2 to be tested are, for example, fiber metal, and are mixed in the sheet S by, as it were, hackling the fiber metal into the base material S1. Several to fifty objects S2 to be tested are embedded throughout an entire sheet S. The objects S2 to be tested have a lower light transmittance than the base material S1 and have a thickness not greater than the sheet S. Therefore, the positions and shapes of the objects S2 to be tested can be visually checked even inside the sheet S, by looking through the sheet S under the light.

FIG. 4 shows how an object S2 to be tested is embedded in the sheet S in cross-sections of the sheet S. For example, if the object S2 to be tested is positioned substantially in the center of the base material S1, as shown in FIG. 4A, the object S2 to be tested can be visually observed at substantially equal densities from both the first and second faces. Alternatively, if the object S2 to be tested is embedded deviated to the first face, as shown in FIG. 4B, the object S2 to be tested is clearly observed from the first face while the object S2 is unclearly observed from the second face. Also alternatively, if the object S2 to be tested is embedded inclined to flat faces of the base material S1, as shown in FIG. 4C, the position where the object S2 to be tested can be visually checked varies between from the first face and from the second face.

Operation

The structure of this embodiment has been described above. Following description will be made of content of processing which the inspection device 100 executes. At first, a series of processing carried out by the inspection device 100 will be described. Then, two operation examples will be described with respect to the processing.

The inspection device 100 is used to determine whether a sheet as an inspection target clears predetermined standards or not. There are various standards concerning this determination, for example, whether a predetermined number of objects to be tested are embedded or not, are located at predetermined positions or not, have predetermined shapes, and so on. The inspection device 100 makes such determination about image data generated by the image reading unit 20. However, there is a risk that determination cannot be achieved accurately if the determination is based on only one face (of the first and second faces). This is because the number, lengths, and shapes of the objects to be tested observed from the first face are not always the same as those viewed from the second face. Hence, the inspection device 100 generates image data from both the first and second faces, and makes determination based on the image data from both faces.

Now, an exemplary determination made by the inspection device 100 will be described with reference to two operation examples in case of determining "whether the number of objects to be tested embedded in a sheet falls within a predetermined range or not" will be described. In these examples, an ideal number of such objects to be embedded in one sheet is "5", which is given a tolerable range of "±1". That is, the number "within a predetermined range" is a number between "4" and "6". A sheet which clears this standard is regarded as a usable (good) product, and a sheet which does not clear the standard is regarded as an unacceptable product. This is the content of determination made according to the embodiment. Each of objects to be tested in the embodiment is fiber metal which has a length of 25 mm and a diameter (or thickness) of 30 μm.

Figure 5:
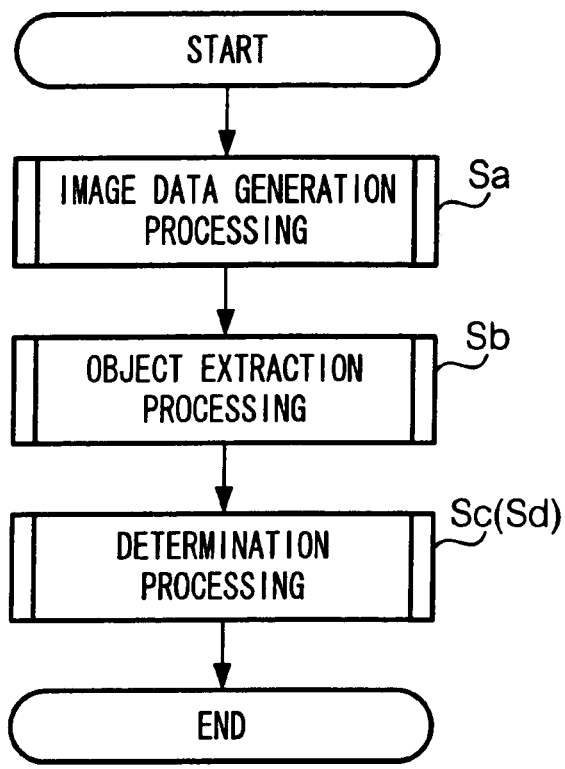
FIG. 5 is a flowchart showing processing when an inspection program is executed by the inspection device.

FIG. 5 is a flowchart showing processing when the inspection program P2 is executed by the controller 10 of the inspection device 100. The inspection program P2 is executed after the controller 10 attains a control signal corresponding to operation conducted by a user to carry out an operation (e.g., presses a button or the like). The processing to be executed at this time is coarsely divided into image data generation processing (steps Sa), object extraction processing (steps Sb), and determination processing (steps Sc or Sd). In the following, these processing steps will be described specifically.

Operation Example 1

Figure 6:
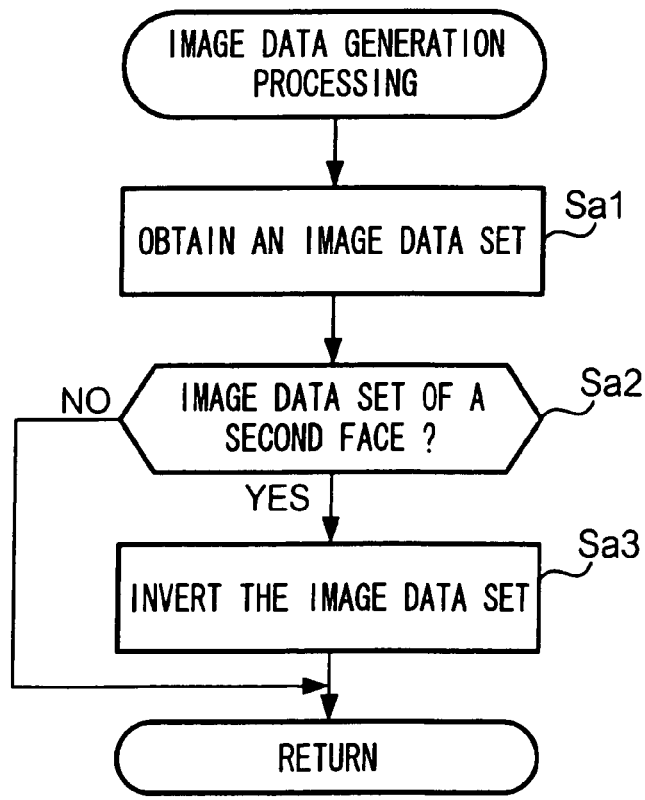
FIG. 6 is a flowchart showing image data generation processing executed by the inspection device.

FIG. 6 is a flowchart showing the image data generation processing in the step Sa. This processing is executed for each of data sets respectively corresponding to the first and second faces. To describe the processing along the flowchart, at first, the controller 10 of the inspection device 100 causes the image reading unit 20 to read a sheet, and obtains an image data set generated by the image reading unit 20 via the interface 13 (step Sa1).

The controller 10 subsequently determines whether the obtained image data set is image data expressing the second face or not (step Sa2). Although what a specific determination method is applied can be arbitrarily determined, for example, the image reading unit 20 can transmit information indicating which of the first and second faces the image data set expresses, along with the image data set. Otherwise, the controller 10 can be configured so as to receive, in predetermined order, image data sets expressing the first and second faces.

If the obtained image data set is image data expressing the second face (step Sa2: Yes), the controller 10 performs processing for inverting this image data set (step Sa3). More specifically, the controller 10 carries out processing so as to invert coordinates of each pixel of the image data set in the X-direction. This is because an image expressed by the image data set of the second face is a mirror image of an image expressed by the image data set of the first face. That is, correspondence can be easily created between a positional relationship among objects to be tested, which appear in the data set of the first face, and a positional relationship among objects to be tested, which are appear in the data set of the second face. Therefore, if the obtained image data set expresses the first face (step Sa2: NO), the controller 10 does not perform inversion processing on this image data set.

The image data generation processing is as has been described above. The controller 10 executes each of the image data sets expressing the first and second faces, to thus obtain two image data sets. The two image data sets subjected to this processing and expressing the first and second faces will be hereinafter referred to as a "first image data set" and "second image data set". That is, the first image data set expresses the first face, and the second image data set is an inversion of an image data set expressing the second face.

Major part of each of the first and second image data sets corresponds to a base material part. Although the base material part has substantially uniform gradation values, unevenness appears in density due to floating of the sheet, uneven irradiation light, or the like. In addition, parts where objects to be tested are embedded appear with slightly different gradation values. However, the gradation values of such parts including objects to be tested differ only slightly from gradation values of the base material part because (parts or all) of such parts are covered with the base material. The inspection device 100 therefore executes the object extraction processing in the steps Sb.

FIG. 7 is a flowchart showing the object extraction processing in the steps Sb. This processing is executed for each of the first and second image data sets. To describe the processing along the flowchart, at first, the controller 10 execute smoothing processing on each of the image data sets (step Sb1). This processing is to reduce variants in density at the base material part, and is achieved by, for example, applying a smoothing filter of a predetermined size. Subsequently, the controller 10 executes an expansion processing on each of the image data sets (steps Sb2). This processing is to emphasize parts where objects to be tested are embedded. Specifically the controller 10 refers to other pixels (hereinafter near pixels) near a target pixel, and replaces the gradation value of the target pixel with the gradation value of a near pixel if any of the near pixels has a greater gradation value (i.e., a deeper color) than the target pixel.

Figure 8A:
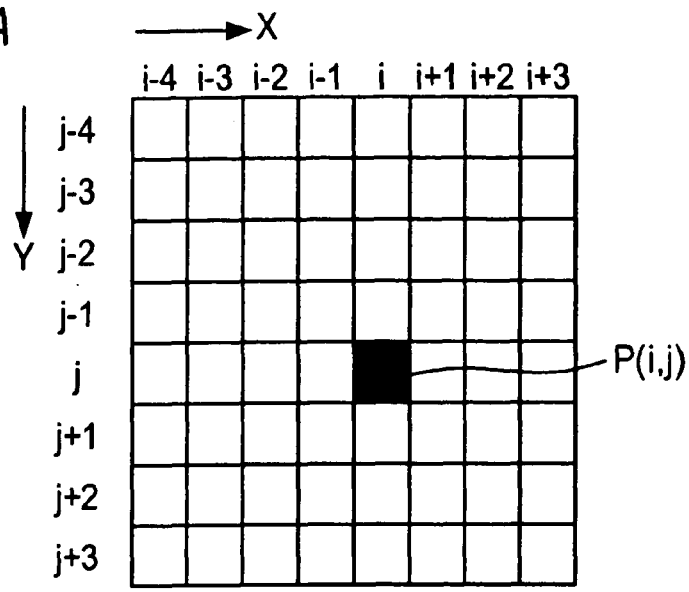
FIG. 8 illustrates expansion processing.
Figure 8B:
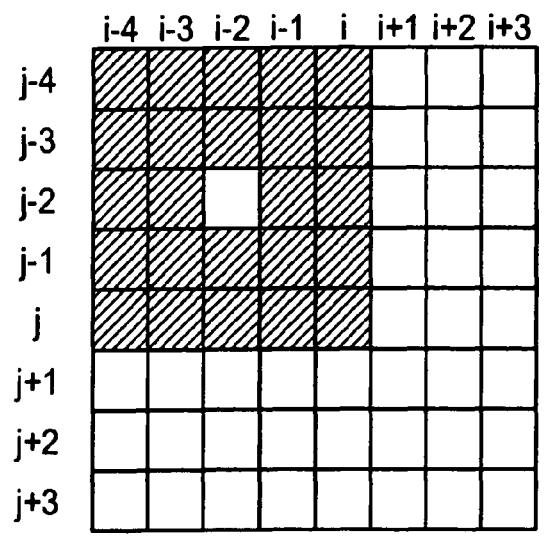
Figure 8C:
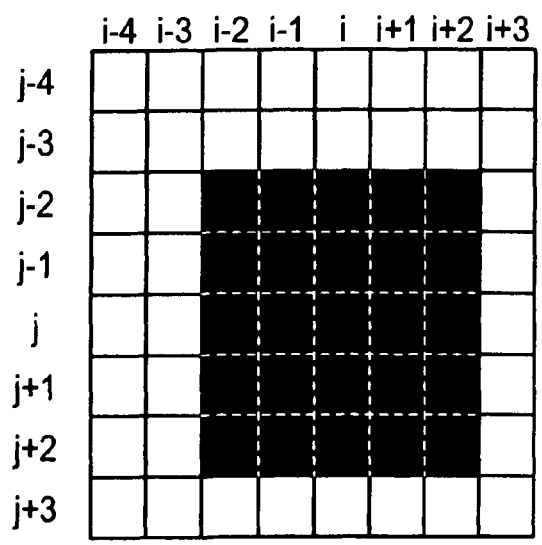

This expansion processing will now be described with a more specific example. For example, assume an image data set having a pixel P(i, j) as shown in FIG. 8A. In this case, "i" denotes a coordinate in the X-direction while "j" denotes a coordinate in the Y-direction. For convenience of explanation, the gradation value of the pixel P is assumed to be "1" as well as gradation values of all other pixels are "0". With respect to this image data set, for example, expansion processing is carried out referring to two lines of pixels on each of the upper, lower, left, and right sides of a target pixel. Where the target pixel is a pixel P(i-2, j-2), near pixels are hatched pixels shown in FIG. 8B. That is, there are 24 near pixels: P(i-4, j-4) to P(i, j-4), P(i-4, j-3) to P(i, j-3), P(i-4, j-2) to P(i-3, j-2), P(i-1, j-2) to P(i, j-2), P(i-4, j-1) to P(i, j-1), and P(i-4, j) to P(i, j). At this time, since near pixels include the pixel P(i, j) having a gradation value "1", the gradation value "0" of the pixel P(i-2, j-2) as a target pixel is replaced with "1". By executing such processing for each pixel, the processing results in that 24 pixels near the pixel P(i, j) have a gradation value "1", as shown in FIG. 8C.

In the expansion processing, the number of near pixels is not limited. For example, in place of two lines of pixels on each of the upper, lower, left, and right sides of a target pixel in the above example, pixels on one line on each of the upper, lower, left, and right sides of a target pixel can be set as near pixels. Hereinafter, expansion processing which sets as near pixels two lines of pixels on each of the four sides of a target pixel will be referred to as "5×5 pixel expansion processing", in the meaning of processing which refers to 5×5 pixels about a target pixel as a center. Likewise, expansion processing which sets as near pixels one line of pixels on each of the four sides of a target pixel will be referred to as "3×3 pixel expansion processing", in the meaning of processing which refers to 3×3 pixels about a target pixel as a center. That is, the expansion processing executed in the step Sb2 is 5×5 pixel expansion processing.

Referring back to the flowchart of FIG. 7, the controller 10 executes again the expansion processing after executing the expansion processing in the step Sb2 (step Sb3). This time, the 3×3 expansion processing is executed. Subsequently, the controller 10 repeats the smoothing processing and expansion processing executed in the steps Sb1, Sb2, and Sb3 in the same order (steps Sb4, Sb5, and Sb6)

Next, the controller 10 calculates an average of gradation values of all pixels in each of the image data sets (step Sb7). The controller 10 determines a threshold used in later binary processing, based on the average calculated at this time (steps Sb8). The threshold and the average can have an arbitrary relationship between each other. For example, the threshold can be a value obtained by multiplying an average by a predetermined coefficient, or by adding "22" to an average, in this operation example.

Further, the controller 10 executes binarization processing, using the threshold decided as described above (steps Sb9). That is, the controller 10 carries out replacement so as to set "0" as gradation values for all the pixels that have smaller gradation values than the threshold as described above and to set "1" as gradation values for all the pixels having gradation values not smaller than the threshold.

After performing the binarization processing, the controller 10 performs processing for extracting objects equivalent to the objects to be tested, depending on the binarized image data set (steps Sb10). In this processing, for example, groups each constituted by continuous pixels are labeled regarding each group as one object, and a length, perimeter, and area of each of such objects are calculated. If the length, perimeter, and area of such an object exceed predetermined thresholds, the object is determined to be equivalent to an object to be tested. At this time, an object extracted due to floating of a sheet or unevenness in irradiated light has length, perimeter, and area which are lower than the thresholds, and is therefore excluded, regarded to be not equivalent to an object to be tested.

In this embodiment, the thresholds for length, perimeter, and area are respectively "350", "850", and "10,000". These thresholds each are expressed in units of "pixels". That is, the length threshold is approximately 14.8 (350/600*25.4) mm. If a term simply written as "object(s)" appears in the description below, the term refers to an object(s) extracted in the step Sb10, i.e., an object equivalent to an object to be tested which appear in a first or second image data set.

After extracting objects, the controller 10 specifies the number of the objects and calculates a length, perimeter, area, centroids, and angle for each of the objects. Calculated values are stored as detection values in the memory 12 (steps Sb11). The "angle" is defined between a predetermined direction (e.g., the X- or Y-direction) and an object, expressed in degrees.

The object extraction processing is as has been described above. As a result of executing the processing, the controller 10 stores detection values for each object for each of the first and second image data sets. For example, if the first image data set is image data as shown in FIG. 9, the controller 10 stores into the memory 12 detection values shown in FIG. 10. As shown in the figure, the controller 10 stores for each object a set of values, the set constituted of a length, a perimeter, an area, centroids (X-direction and Y-direction), and an angle. Since one set of detection values is stored for each of objects, the numbers of the objects can be specified by the number of sets of detection values. In case where the first image data set is image data as shown in FIG. 9, the number of objects is "5".

In some cases, the second image data set can be coupled with the first image data. For example, if the first image data set has image data as illustrated in FIG. 9, the second image data set has, for example, image data as illustrated in FIG. 11. Objects b, c, d, and e in FIG. 11 correspond respectively to objects B, C, D, and E in FIG. 9. Obviously from comparison with the first image data set shown in FIG. 9, the second image data set shown in FIG. 11 includes fewer objects than the first image data. This inclusion of fewer objects means that an object A is embedded close to the first face of the sheet and could not be extracted, as an object equivalent to an object to be tested, from the second face.

Figure 12:
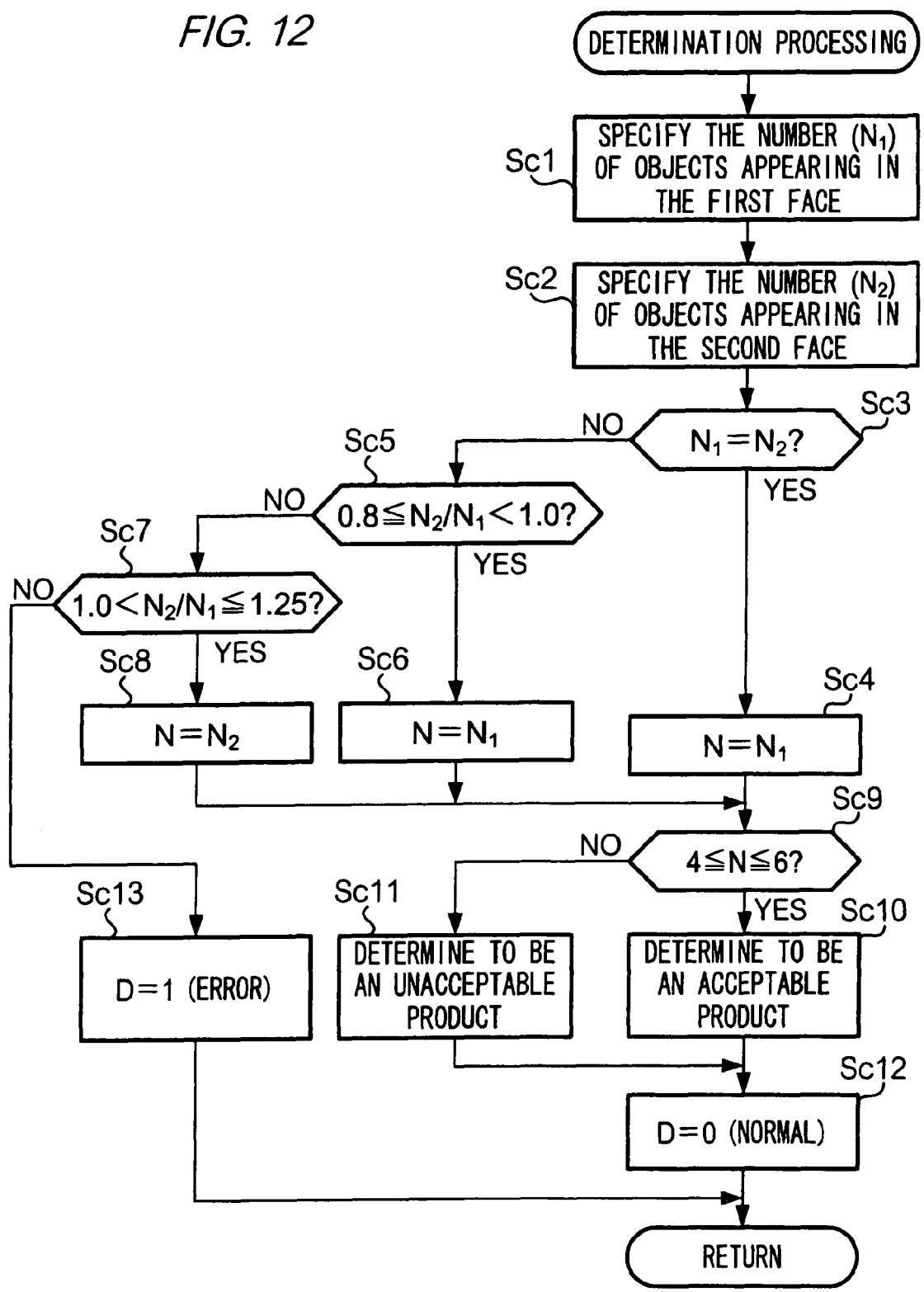
FIG. 12 is a flowchart showing determination processing executed by the inspection device (operation example 1)

Subsequently, the controller 10 executes determination processing in the steps Sc, using the extracted objects. FIG. 12 is a flowchart showing the determination processing in the steps Sc. This processing is carried out by comparing the objects extracted from the first and second image data sets. To describe the processing along the flowchart, at first, the controller 10 reads detection values stored in the memory 12, and specifies the numbers of objects appearing in the first image data set (related to the first face) and the second image data set (related to the second face), respectively (steps Sc1 and Sc2). The controller 10 stores into the memory 12 the specified number of objects appearing in the first image data set, as N1, as well as the specified number of objects appearing in the second image data set, as N2.

The controller 10 then estimates the number of objects embedded in the sheet, depending on the numbers of objects (N1, N2) appearing in the first and second image data sets. Detailed flow of the estimation varies depending on the above values N1 and N2. At first, the controller 10 determines whether N1 and N2 are equal to each other or not (step Sc3). If these values are equal (step Sc3: YES), the controller 10 regards an number of objects to be tested, which is equal to the values, to be embedded in the sheet. Therefore, the controller 10 regards N to be equal to the value of N1, referring to the number of objects to be tested which are embedded in the sheet as N. That is, in this case, the controller 10 substitutes the value of N1 for N and stores the value into the memory 12 (step Sc4).

Otherwise, if the values N1 and N2 are not equal (step Sc3: NO), the controller 10 determines which of N1 and N2 is greater. Specifically, the controller 10 first calculates a ratio of N2 to N1 (N2/N1) and determines whether N2/N1 is equal to or greater than "0.8" and is smaller than "1.0" or not (step Sc5). If N2/N1 satisfies the range of 0.8<=N2/N1<1.0 (step Sc5: YES), the controller 10 regards N, which is the number of objects embedded in the sheet, to be equal to the value of N1. Therefore, the controller 10 substitutes N1 for the number N of objects embedded in the sheet, and stores the value N1 into the memory 12 (step Sc6).

If N2/N1 does not satisfy 0.8<=N2/N1<1.0 (step Sc5: NO), the controller 10 determine whether N2/N1 is greater than "1.0" and is equal to or smaller than "1.25" or not (step Sc7). If N2/N1 satisfies 1.0<N2/N1<=1.25 (step Sc7: YES), i.e., if N2 is greater than N1, the controller 10 regards the number N of objects to be tested, which are embedded in the sheet, to be equal to the value of N2. Therefore, the controller 10 substitutes the value of N2 for the number N of objects to be tested which are embedded in the sheet, and stores this value into the memory 12 (step Sc8).

If the number N of objects to be tested, which are embedded in the sheet is specified as any value, the controller 10 determines whether the sheet is an acceptable product or not. As described above, in this operation example, a tolerable range from "4" to "6" is set for the number of objects to be tested, the controller 10 determines whether the number N of objects to be tested is within this range or not (step Sc9). If the number N of objects to be tested is within the range from "4" to "6" (step Sc9: YES), the controller 10 determines the read sheet to be an acceptable product, and informs the notification unit 40 of the sheet being an acceptable product, by generating an image signal or audio signal indicative of the sheet being an acceptable product (step Sc10). Otherwise, if the number N of objects to be tested is not within the range from "4" to "6" (step Sc9: NO), the controller 10 determines the read sheet to be an unacceptable product, and informs the notification unit 40 of the sheet being an unacceptable product, by generating an image signal or audio signal indicative of the sheet being an unacceptable product (step Sc11). Thereafter, the controller 10 outputs information informing that determination is completed normally by the inspection program P2. Specifically, the controller 10 refers to, as D, the data indicative of the determination result by the inspection program P2, and sets the value of D to "0" (step Sc12).

N2/N1 which does not satisfy 1.0<N2/N1<=1.25 (step Sc7: NO) means that the N2/N1 is smaller than "0.8" or greater than "1.25". In this case, the controller 10 determines that objects to be tested are not adequately embedded in the sheet or that objects to be tested were not read correctly. Therefore, the controller 10 regards the number N of objects to be tested, which are embedded in the sheet, to be indefinite, and outputs information informing that determination by the inspection program P2 has resulted in an error. Specifically, the controller 10 sets the value of the data D to "1" (step Sc13).

The determination processing is as described above. The processing executed by the inspection program P2 is thereby terminated. As a result of executing such processing, the controller 10 obtains, as processing results, the number N of objects to be tested, which are embedded in the sheet, and the data D indicative of the determination result. If the data D indicative of the determination result is "1", the controller 10 further supplies the notification unit 40 with an image signal or audio signal expressing that an error is the determination made by the inspection device 100. Otherwise, if the data D indicative of the determination result is "0", the notification unit 40 can be supplied with an image signal or audio signal indicating that the determination by the inspection device 100 is successful.

Operation Example 2

Described next will be a different operation example from the operation example 1 above. This example will described different determination processing from the operation example 1 described above. Image data generation processing and object extraction processing prior to determination processing are the same as those in the operation example 1 and will be omitted from description made below.

The determination processing according to this operation example is characterized in that an image area of each of first and second image data sets is divided into predetermined small areas, and the number of objects to be tested which are embedded in an entire sheet is specified depending on the numbers of objects appearing in respective ones of the small areas. Although each image data set can be divided into an arbitrary number of small areas, this operation example will be described exemplifying a case of dividing an image area into six small areas.

Figure 13:
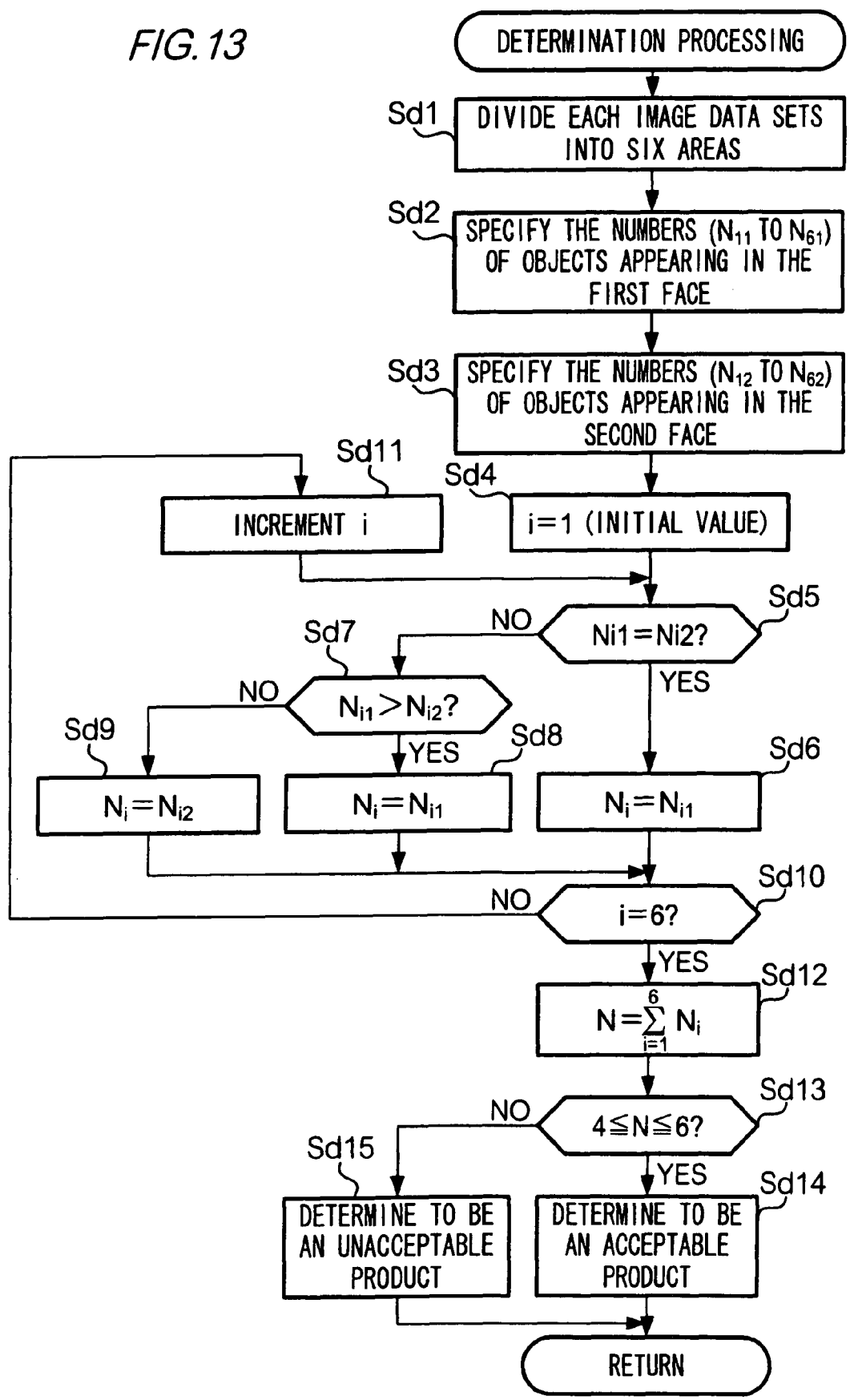
FIG. 13 is a flowchart showing determination processing executed by the inspection device (operation example 2)

FIG. 13 is a flowchart showing the determination processing in this operation example. To describe the processing along the flowchart, at first, the controller 10 divides the image area of each of the first and second image data sets into sex small areas (step Sd1). At this time, the controller 10 divides the image areas so that the small areas of the first image data set and the small areas of the second image data set have the same shapes, respectively. If possible, the small areas in each of the image data sets have an identical shape to each other.

The controller 10 next specifies the number of objects appearing in the first image data set (related to the first face) for each of the divided small areas (step Sd2). In the following, the numbers of objects, which are specified for the small areas, are respectively referred to as N11, N21, N31, N41, N51, and N61. Subsequently, the controller 10 specifies the number of objects appearing in the second image data set (related to the second face) in the same manner as described. The numbers of objects, which are specified for the small areas, are respectively referred to as N12, N22, N32, N42, N52, and N62. N11 and N12 correspond to an equal position. N21 and N22 correspond to an equal position as well. Each of the other pairs of values corresponds to an equal position similarly.

The processing described above is charted as shown in FIG. 14. In this flowchart, the image data set D1 expresses the first face as well as the image data set D2 the second face. Small areas of the image data set D1 are respectively referred to as 11, 21, 31, 41, 51, and 61, as well as small areas of the second image data set D2 as 12, 22, 32, 42, 52, and 62. Although the image data sets D1 and D2 are image data read from one single sheet, appearing objects differ partially between the image data sets D1 and D2. This means existence of an object which is extracted from one face but is not from the other face. For convenience of explanation, the position of an object which is not extracted but is embedded in a sheet is drawn by a broken line in the figures.

Referring now back to the flowchart in FIG. 13, the controller 10 substitutes "1" for a parameter i after specifying the number of objects for each small area (step Sd4). After substituting "1" for the parameter i, the controller 10 compares the numbers of objects between every corresponding small areas. This processing is to compare, for example, N11 and N12 described above when the parameter i is "1". This example will be further described continuously. The controller 10 determines first whether the values of N11 and N12 are equal or not (step Sd5). If the values of N11 and N12 are equal (step Sd5: YES), the controller 10 regards the number of objects to be tested, which are embedded in a corresponding small area in the sheet, to be also equal to the values. The controller 10 takes N1 as the number of objects embedded in the corresponding small area in the sheet, and hence regards the value of N1 to be equal to the value of N11. That is, in this case, the controller 10 substitutes the value of N11 for N1, and stores this value into the memory 12 (step Sd6).

Otherwise, if the values of Ni1 and Ni2 are not equal (step Sd5: NO), the controller 10 determines which of Ni1 and Ni2 is greater (step Sd7). If the value of Ni1 is greater than the value of Ni2 (step Sd7: YES), the controller 10 regards the number of objects embedded in the corresponding area in the sheet to be equal to the value of Ni1. Therefore, the controller 10 substitutes the value of Ni1 for the number Ni of objects to be tested, which are embedded in the corresponding small area, and stores this value into the memory 12 (step Sd8). Otherwise, if the value of Ni2 is greater than the value of Ni1 (step Sd7: NO), the controller 10 regards the number Ni of objects to be tested, which are embedded in the corresponding small area in this sheet, to be equal to the value of Ni2. Therefore, the controller 10 substitutes the value of Ni2 for the number Ni of objects to be tested, which are embedded in the corresponding area in the sheet, and stores this value into the memory 12 (step Sd9).

Subsequently, the controller 10 determines whether the parameter i is "6" or not (step Sd10). If the parameter i does not reach "6" (step Sd10: NO), the controller 10 increments the parameter i by "1" (step Sd11) and repeats processing from the step Sd5. If the parameter i is "6" (step Sd10: YES), i.e., if the numbers N1 to N6 of objects to be tested are specified respectively for all of the small areas, the controller 10 calculates a total sum of these numbers and takes the total sum as the number of objects to be tested which are embedded in the sheet (step Sd12).

If the number N of objects to be tested, which are embedded in the sheet, is specified as any value, the controller 10 then determines whether the sheet is a acceptable product or not. The determination is made in the same manner as described in the operation example 1. That is, the controller 10 determines whether the number N of objects to be tested is between "4" to "6" (step Sd13). If the number N is between "4" and "6" (step Sd13: YES), the controller 10 determines the read sheet to be an acceptable product (step Sd14). Otherwise, if not between "4" and "6" (step Sd13: NO), the controller 10 determines the read sheet to be an unacceptable product (step Sd15). The determination processing according to this operation example 2 then ends.

Figure 14:
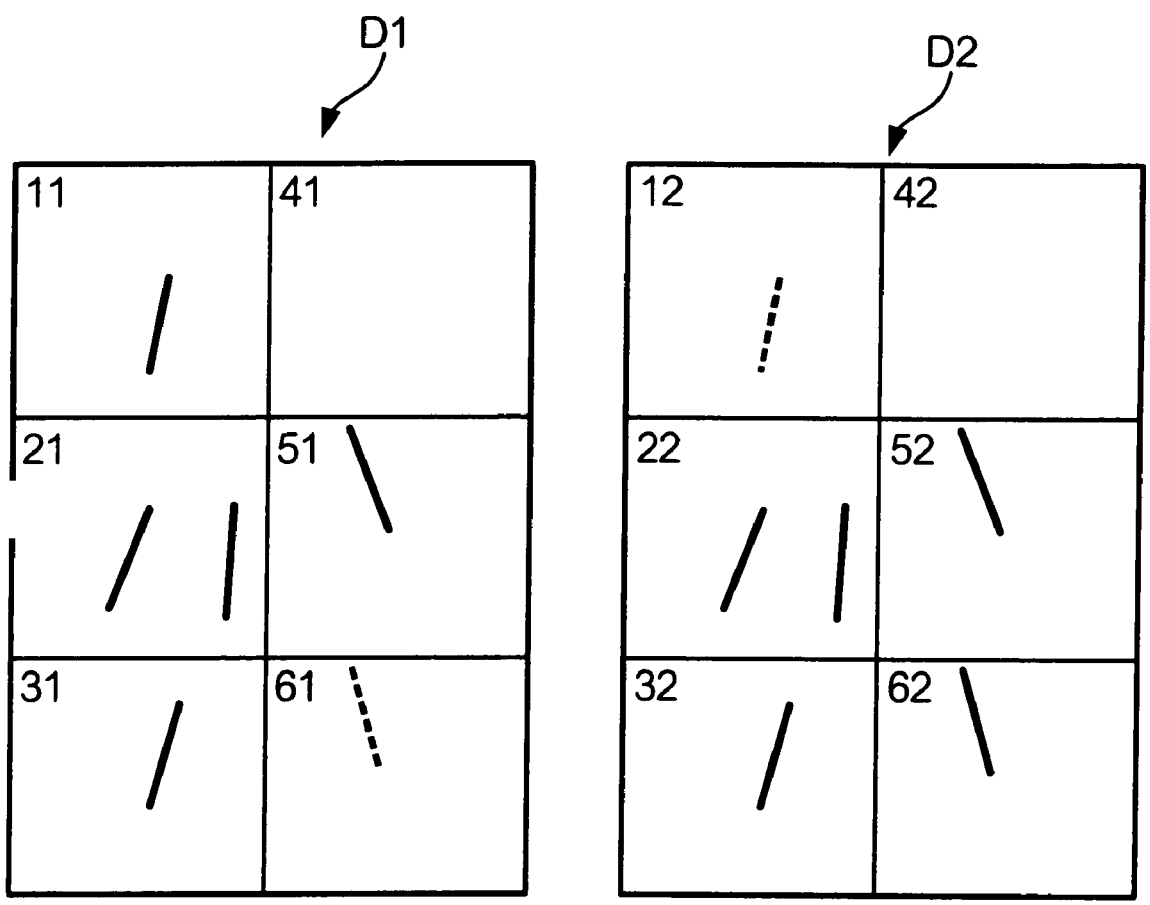
FIG. 14 shows examples of first and second image data sets.

Results of the determination processing as described above will now be described with a more specific example. Described now will be a case of executing the above determination processing on the Image data sets D1 and D2 shown in FIG. 14. The small areas 11 and 21 are compared first. Then, "1" is the number (N11) of objects appearing in the former small area while "0" is the number of objects appearing in the latter small area 21. Therefore, the number (N1) of objects embedded in a corresponding area in this sheet is specified to be "1". In a similar manner, the values of N2, N3, N4, N5, and N6 are respectively specified to be "2", "1", "0", "1", and "1". As a result, the number N of objects to be tested which are embedded in the sheet is specified to be "6" (=1+2+1+0+1+1). For comparison, If the determination processing described in the operation example 1 is effected on the image data sets D1 and D2 shown in FIG. 14, the number N of objects to be tested which are embedded in the sheet is specified to be "5". As a conclusion as far as the example shown in FIG. 14 is concerned, the determination processing described in the operation example 2 estimates a rather exact result which complies with the actual number of objects to be tested.

Modifications

The invention has been described referring to an exemplary embodiment. The invention is not limited to the above embodiment but can be practiced in other various modes. For example, the above embodiment can be modified as follows according to the invention. Such modifications can be appropriately combined with one another.

Although the above embodiment cites a sheet as an example of "sheet-type material", the sheet-type material according to the invention is not limited to a sheet. For example, the "sheet-type material" may be a card-type object such as an IC card or a film made of synthetic resin. With respect to objects to be tested, objects to be tested each are described as fiber metal. As alternatives, objects to be tested each may be an object such as an IC chip and are not limited to fibrous objects. For example, the objects to be tested each may be tape-type metal which is shaped thinner than a base material. Further, the material of objects to be tested is not limited to metal but may be plastics or magnetic material which creates Barkhausen effects.

Also the above embodiment describes a case of determining whether predetermined objects to be tested which are embedded in a sheet-type material are embedded in desired condition or not. On the contrary, the invention is applicable even to a purpose of detecting existence of foreign material like rubbish or the like, which is undesirably embedded in a sheet-type material, and of selecting sheet-type materials, depending on whether such foreign material is included beyond a predetermined standard or not.

Also the above embodiment uses two image pickup systems (each constituted of a light source and a sensor) to generate image data sets simultaneously for two faces. However, image data sets for two faces may be generated by one single image pickup system by reversing a sheet.

In the above embodiment, a determination result indicative of an acceptable or unacceptable product is supplied to the notification unit 40. However, this determination result may be utilized to distinguish acceptable and unacceptable products. For example, the invention may be configured so as to include two container units to store sheet-type materials. If a sheet-type material is determined to be an acceptable product, the sheet-type material may be put in one of the container units. If not, the sheet-type material may be put into the other container unit.

Also in the above embodiment, the object extraction processing is executed along the flowchart shown in FIG. 7. However, The determination processing is not limited to this processing flow. For example, the smoothing processing and expansion processing both of which are repeated plural times in the above embodiment may be performed only one time each. Alternatively, either one of both processing may be omitted. Neither smoothing processing not expansion processing may be executed if a sheet-type material is constituted of a base material and an object to be tested which can be apparently distinguished from each other.

The flow of object extraction processing may further be configured to differ between first and second image data sets. For example, when two image pickup systems do not have equal characteristics, different object extraction processing flows may be prepared in advance properly for the image pickup systems, respectively, to adjust such inequality in characteristics. The different flows may be executed selectively for the respective image data sets.

Also in the above embodiment, determination is made about the number of objects appearing in each of two surfaces. Standards for determination are not limited to the number of objects but can be a length, perimeter, area, centroids, or angle of each object. More specifically, whether or not a centroid of an object is located at a predetermined position can be determined, or whether the number of objects having a predetermined length or more reaches a predetermined number can be determined. Alternatively, when specifying a length, perimeter, area, centroid, or an angle of an object to be tested depending on a detection value concerning an object, an average between detection values of two faces can be used.

Another determination method than described above can be made to decide whether or not an object to be tested is embedded in predetermined condition. The method will now be described with reference to FIG. 4. If an object S2 to be tested is positioned at a substantial center of a base material S1, as shown in FIG. 4A, detection values are substantially equal between two faces with high provability. On the other side, in the condition as shown in FIG. 4B or 4C, detection values disagree between two faces. Suppose now that the condition as shown in FIG. 4A is desired condition. Then, an object to be tested is determined to be not embedded in a predetermined condition if detection values about the object to be tested differ beyond a predetermined level between two faces.

Although the invention is applied to an inspection device in the above embodiment, functions equivalent to the controller 10 described above can be incorporated into an image generating device such a copying machine or printer or an image reader such as a scanner. In addition, the invention can be provided as a program equivalent to the inspection program P2 described above or as a recording medium such as a ROM which records the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
an obtaining unit that obtains a first image data set expressing a first face of a sheet-type material, and a second image data set expressing a second face opposite to the first face, wherein one or more objects to be tested is embedded inside the sheet-type material and positions of the one or more objects with respect to a thickness value of the sheet-type material may not be constant; and
a specifying unit that specifies a condition of the embedded one or more objects to be tested in the sheet-type material, depending on the first and second image data sets obtained by the obtaining unit.

2. The image processing device according to claim 1, wherein the specifying unit compares numbers of the one or more objects to be tested appearing in the first and second image data sets, and specifies a greater one of the numbers to be a number of the one or more objects to be tested embedded in the sheet-type material.

3. The image processing device according to claim 1, wherein the specifying unit divides each of image areas expressed by the first and second image data sets into predetermined image areas, and specifies a number of the one or more objects to be tested for each of the predetermined image areas.

4. The image processing device according to claim 3, wherein the specifying unit compares numbers of the one or more objects to be tested appearing in the first and second image data sets, for each pair of mutually corresponding ones of the predetermined image areas, specifies a greater one of the numbers to be a number of the one or more objects to be tested embedded in each pair of mutually corresponding ones of the predetermined image areas, and specifies, as a number of the one or more objects to be tested embedded in the sheet-type material, a total sum of the numbers specified for all the pairs of mutually corresponding ones of the predetermined image areas.

5. The image processing device according to claim 1, wherein the specifying unit includes an output unit that outputs predetermined information if a ratio between a number of the one or more objects to be tested appearing in the first image data set and a number of the one or more objects to be tested appearing in the second image data set falls outside of a predetermined range.

6. The image processing device according to claim 1, wherein the specifying unit includes a processing execution unit that executes predetermined image processing on each of the first and second image data sets obtained by the obtaining unit.

7. The image processing device according to claim 6, wherein the image processing for the first image data set is different from the image processing for the second image data set.

8. The image processing device according to claim 6, wherein the processing execution unit executes at least one of smoothing processing, expansion processing, and binarization processing.

9. The image processing device according to claim 8, wherein the processing execution unit executes the expansion processing after executing the smoothing processing, and executes the binarization processing after executing the expansion processing.

10. The image processing device according to claim 1, wherein:
the sheet-type material includes a base material; and
the one or more objects is fiber metal mixed in the sheet-type material hackling the fiber metal into the base material.

11. An inspection device comprising:
an obtaining unit that obtains a first image data set expressing a first face of a sheet-type material, and a second image data set expressing a second face opposite to the first face, wherein one or more objects to be tested is embedded inside the sheet-type material and positions of the one or more objects with respect to a thickness value of the sheet-type material may not be constant; and
a determining unit that specifies a condition of the embedded one or more objects to be tested in the sheet-type material, depending on the first and second image data sets obtained by the obtaining unit, so as to determine whether or not the condition of the embedded one or more objects to be tested in the sheet-type material satisfies a predetermined standard.

12. An image processing method comprising;
obtaining a first image data set expressing a first face of a sheet-type material, and a second image data set expressing a second face opposite to the first face, wherein one or more objects to be tested is embedded inside the sheet-type material and positions of the one or more objects with respect to a thickness value of the sheet-type material may not be constant; and
specifying a condition of the embedded one or more objects to be tested in the sheet-type material, depending on the obtained first and second image data sets,
wherein the method is performed using a processor or computer.

13. A method for inspecting a sheet-type material, comprising:
obtaining a first image data set expressing a first face of the sheet-type material, and a second image data set expressing a second face opposite to the first face, wherein one or more objects to be tested is embedded inside the sheet-type material and positions of the one or more objects with respect to a thickness value of the sheet-type material may not be constant; and
specifying a condition of the embedded one or more objects to be tested embedded in the sheet-type material, depending on the obtained first and second image data sets, so as to determine whether or not the condition of the embedded one or more objects to be tested in the sheet-type material satisfies a predetermined standard,
wherein the method is performed using a processor or computer.

14. A non-transitory computer readable medium storing a program that causes a computer to execute a process for image processing, the process comprising:
obtaining a first image data set expressing a first face of a sheet-type material, and a second image data set expressing a second face opposite to the first face, wherein one or more objects to be tested is embedded inside the sheet-type material and positions of the one or more objects with respect to a thickness value of the sheet-type material may not be constant; and
specifying a condition of the embedded one or more objects to be tested embedded in the sheet-type material, depending on the first and second image data sets.

15. A non-transitory computer readable medium storing a program that causes a computer to execute process for inspecting a sheet-type material, the process comprising:
obtaining a first image data set expressing a first face of a sheet-type material, and a second image data set expressing a second face opposite to the first face, wherein one or more objects to be tested is embedded inside the sheet-type material and positions of the one or more objects with respect to a thickness value of the sheet-type material may not be constant; and
specifying a condition of the embedded one or more objects to be tested in the sheet-type material, depending on the first and second image data sets, so as to determine whether the condition of the embedded one or more objects to be tested in the sheet-type material satisfies a predetermined standard.

* * * * *